United States Patent
Ando (10) Patent No.: US 8,109,374 B2
(45) Date of Patent: Feb. 7, 2012

(54) PRODUCTION METHOD FOR CONED DISK SPRING AND CLUTCH UNIT

(75) Inventor: Shuji Ando, Aikoh-gun (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 820 days.

(21) Appl. No.: 12/223,399

(22) PCT Filed: Mar. 22, 2007

(86) PCT No.: PCT/JP2007/055898
§ 371 (c)(1),
(2), (4) Date: Jul. 30, 2008

(87) PCT Pub. No.: WO2007/111222
PCT Pub. Date: Oct. 4, 2007

(65) Prior Publication Data
US 2009/0008209 A1    Jan. 8, 2009

(30) Foreign Application Priority Data
Mar. 24, 2006  (JP) .................................. 2006-082267

(51) Int. Cl.
*F16D 25/0638* (2006.01)
*F16D 13/52* (2006.01)
*F16F 1/32* (2006.01)

(52) U.S. Cl. ............... 192/48.1; 29/896.91; 192/48.619; 192/85.34

(58) Field of Classification Search ............. 192/48.619, 192/85.34; 148/580; 470/41, 197
See application file for complete search history.

(56) References Cited

U.S. PATENT DOCUMENTS

| | | | |
|---|---|---|---|
| 4,573,560 A * | 3/1986 | Eguchi | 192/85.34 |
| 4,989,696 A * | 2/1991 | Buell | 29/412 |
| 5,480,361 A | 1/1996 | Murakami et al. | |
| 6,308,397 B1 | 10/2001 | Nishimura et al. | |
| 7,247,114 B2 * | 7/2007 | Kaneda et al. | 192/85.34 |

FOREIGN PATENT DOCUMENTS

| | | |
|---|---|---|
| DE | 33 08 026 A1 | 10/1983 |
| JP | A-58-132326 | 8/1983 |
| JP | 59-10548 U | 1/1984 |
| JP | 2-14127 B2 | 4/1990 |
| JP | A-06-106277 | 4/1994 |
| JP | A-09-032918 | 2/1997 |
| JP | A-2005-282811 | 10/2005 |

OTHER PUBLICATIONS

Supplementary European Search Report issued in European Patent Application No. 07739341.1 dated Nov. 18, 2010.

* cited by examiner

*Primary Examiner* — Rodney Bonck
(74) *Attorney, Agent, or Firm* — Oliff & Berridge, PLC (57) ABSTRACT

A production method for coned disk springs includes: preparing a plate member; punching plural annular blanks from the plate member by pressing; and forming the blanks into coned disk springs. In the pressing, plural slits are formed at one of a peripheral portion and an inner peripheral portion of at least one of the blanks, and a smaller outer diameter blank among the blanks is punched from an inner region of a larger outer diameter blank among the blanks.

3 Claims, 5 Drawing Sheets

| US 8,109,374 B2 |

PRODUCTION METHOD FOR CONED DISK SPRING AND CLUTCH UNIT

TECHNICAL FIELD

The present invention relates to production methods for coned disk springs (springs shaped like a dish without a bottom) and relates to a multiple-plate clutch unit which has plural coned disk springs having outer diameters which are different from each other. In particular, the present invention relates to a technique for improving of the production yield of the coned disk springs.

BACKGROUND ART

A clutch unit for transport machines is equipped with a wet multiple-plate clutch mechanism. The wet multiple-plate clutch mechanism has a clutch drum which is nearly in the shape of a cup. In the clutch drum, an annular coned disk spring is provided between a driven plate and a piston, the driven plate being provided proximate to a bottom surface of the clutch drum so as to be movable in an axial direction (see Japanese Unexamined Patent Application Publication No. 9-32918). The coned disk spring is disposed such that an inner peripheral edge portion of the coned disk spring is supported by the piston and a peripheral edge portion thereof is supported by the driven plate proximate to the bottom surface. The coned disk spring elastically deforms so that the shape thereof changes from a shape which is similar to that of a dish to one which is nearly flat, thereby absorbing shocks which occur in the engaging action of the clutch mechanism.

Figure 6:
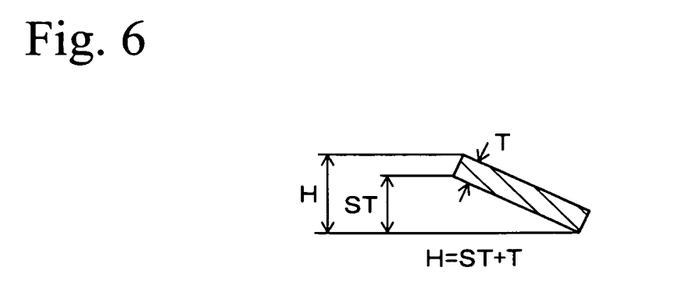
FIG. 6 is a side cross sectional view showing a structure of side portion of a coned disk spring and the relationship of stroke distance ST, thickness T, and height H.

In properties of the above coned disk spring, a load (hereinafter referred to as "flat deformation time load"), which is generated in the coned disk spring when the coned disk spring deforms to become nearly flat by elastic deformation (that is, when displacement amount of the coned disk spring reaches the stroke distance ST defined by the difference between the height H and the thickness T as shown in FIG. 6), is necessary as a design parameter of the clutch mechanism. The flat deformation time load depends on the outer diameter, inner diameter, thickness T and stroke distance ST of the coned disk spring. The outer diameter, the inner diameter, and the stroke distance ST are determined as design parameters beforehand. Therefore, the flat deformation time load is controlled by the thickness T.

In clutch units for CVT (Continuously Variable Transmission) vehicles and AT (Automatic Transmission) vehicles, there is a clutch unit equipped with plural clutch mechanisms which are different from each other in size and have the same axis. In each clutch mechanism, a coned disk spring, which has an outer diameter corresponding to clutch drum thereof, is disposed. In this case, since flat deformation time loads of the coned disk springs are not generally equal to each other, the respective coned disk springs are produced from materials which are different from each other in thickness.

However, materials, from which blanks of the coned disk springs have been punched, cannot be used, and they are thereby scraped. In the production of the coned disk springs, amount of scrapped materials is very large. Due to this, the material yield of the coned disk spring is low, and the production cost is thereby very high.

DISCLOSURE OF THE INVENTION

Therefore, an object of the present invention is to provide a production method for coned disk springs, which can reduce production cost. Another object is to provide a less expensive clutch unit equipped with the coned disk springs obtained by the production method of the present invention.

According to one aspect of the present invention, a production method for coned disk springs includes: preparing a plate member; punching plural annular blanks from the plate member by pressing; and forming the blanks into coned disk springs. In the pressing, plural slits are formed at one of a peripheral portion and an inner peripheral portion of at least one of the blanks, and a smaller outer diameter blank among the blanks is punched from an inner region of a larger outer diameter blank among the blanks.

In the coned disk spring having the slits formed at the peripheral portion or the inner peripheral portion thereof, a load is applied to the coned disk spring, the coned disk spring elastically deforms such that the shape of the coned disk spring changes from a shape which is similar to that of a dish to one which is nearly flat. In this case, a load generated in the coned disk spring is reduced by the slits. Therefore, a load generated when the coned disk spring deforms to be nearly flat, that is, when displacement amount of the coned disk spring reaches the stroke distance ST defined by the difference between the height H and the thickness T as shown in FIG. 6), is reduced. Therefore, when a larger outer diameter coned disk spring and a smaller outer diameter coned disk spring are obtained from one plate member as the present invention, the plate member has a thickness which corresponds to a thickness of a coned disk spring required to exhibit a larger flat deformation time load, and slits are formed to a coned disk spring required to exhibit a smaller flat deformation time load.

Figure 3A:
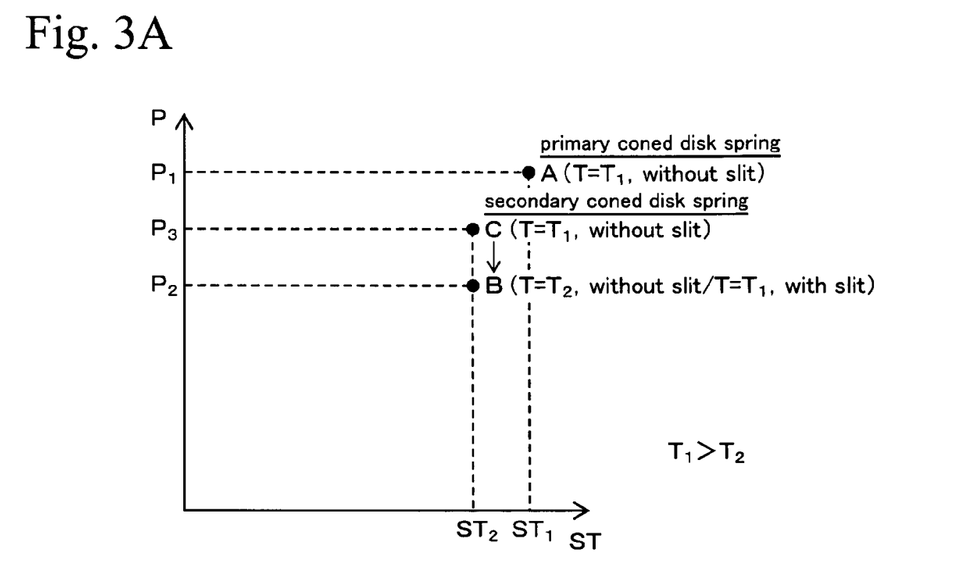
FIG. 3A is a diagram showing relationships between stroke distance ST and flat deformation time load P of various coned disk springs according to the present invention when a primary coned disk spring having a larger outer diameter has a thickness larger than that of a secondary coned disk spring having a smaller outer diameter and exhibiting a desired flat deformation time load.
Figure 3B:
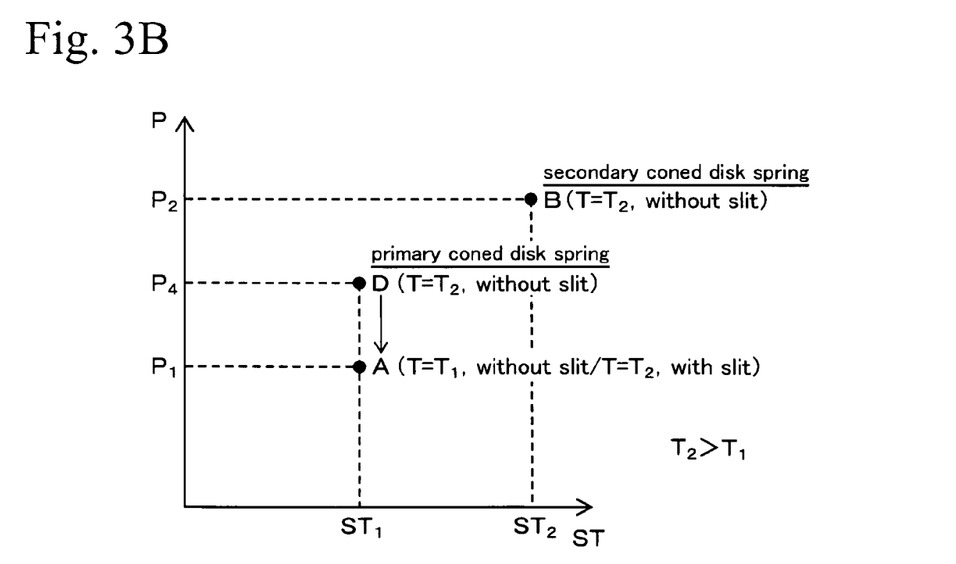
FIG. 3B is a diagram showing relationships between the stroke distance ST and the flat deformation time load P of various coned disk springs according to the present invention when a secondary coned disk spring having a smaller outer diameter has a thickness larger than that of a primary coned disk spring having a larger outer diameter and exhibiting a desired flat deformation time load.

This will be explained hereinafter with reference to FIGS. 3A and 3B. FIG. 3A is a diagram showing relationships between stroke distance ST and flat deformation time load P of various coned disk springs according to the present invention when a primary coned disk spring having a larger outer diameter has a thickness larger than that of a secondary coned disk spring having a smaller outer diameter. FIG. 3B is a diagram showing relationships between stroke distance ST and flat deformation time load P of various coned disk springs according to the present invention when a secondary coned disk spring having a smaller outer diameter has a thickness larger than that of a primary coned disk spring having a larger outer diameter. The magnitude relationship of stroke distances $ST_1$ and $ST_2$ and the magnitude relationship of flat deformation time loads $P_1$ and $P_2$ can be freely selected.

First, the case shown in FIG. 3A will be explained hereinafter. In a larger outer diameter coned disk spring (hereinafter simply referred to "primary coned disk spring"), which has a larger outer diameter, stroke distance $ST_1$ and flat deformation time load $P_1$ denoted by point A are required. In a smaller outer diameter coned disk spring (hereinafter simply referred to "secondary coned disk spring"), which has a smaller outer diameter, stroke distance $ST_2$ and flat deformation time load $P_2$ denoted by point B are required. A coned disk spring satisfying properties denoted by the point A is a primary coned disk spring having no slit and having a thickness $T_1$. A coned disk spring satisfying properties denoted by the point B is a secondary coned disk spring having no slit and having a thickness $T_2$ which is smaller than the thickness $T_1$.

In order to obtain a primary coned disk spring and a secondary coned disk spring from one plate member, when the thickness of the secondary coned disk spring is set to be a thickness $T_1$, the thickness of the secondary coned disk spring is larger, so that the secondary coned disk spring is a secondary coned disk spring exhibiting a flat deformation time load $P_3$ (which is larger than a flat deformation time load $P_2$) denoted by point C. Due to this, a secondary coned disk spring exhibiting a flat deformation time load $P_2$ cannot be obtained. However, in this case, the secondary coned disk spring is a secondary coned disk spring with slits by forming slits at a peripheral portion or an inner peripheral portion of the secondary coned disk spring, the flat deformation time load of the secondary coned disk spring can be reduced by the slits as described above. Therefore, in the secondary coned disk spring with slits, even when the thickness thereof is set to be thickness $T_1$ which is the same as that of the primary coned disk spring, the shapes of the slits, the number thereof, and the intervals between the slits are appropriately selected, so that the secondary coned disk spring can exhibit the desired flat deformation time load $P_2$.

Next, the case shown in FIG. 3B will be explained below. This case shown in FIG. 3B is different from the above case shown in FIG. 3A in that the primary coned disk spring satisfying properties denoted by point A has a thickness which is smaller than that of secondary coned disk spring (that is, thickness $T_2$ is larger than thickness $T_1$).

In order to obtain a primary coned disk spring and a secondary coned disk spring from one plate member, when thickness of the primary coned disk spring is set to be a thickness $T_2$, the thickness of the primary coned disk spring is larger, and the primary coned disk spring is a primary coned disk spring exhibiting a flat deformation time load $P_4$ (which is larger than a flat deformation time load $P_1$) denoted by point D. Due to this, a primary coned disk spring exhibiting a flat deformation time load $P_1$ cannot be obtained. However, in this case, the primary coned disk spring is a primary coned disk spring with slits by forming slits at a peripheral portion or an inner peripheral portion of the primary coned disk spring, the flat deformation time load can be reduced by the slits as described above. Therefore, in the primary coned disk spring with slits, even when the thickness thereof is set to be thickness $T_2$ which is the same as that of the secondary coned disk spring, the shapes of the slits, the number thereof, and the intervals between the slits are appropriately selected, so that the primary coned disk spring can exhibit the desired flat deformation time load $P_1$.

As described above, in the production method for coned disk spring of the present invention, the shapes of the slits, the number thereof, and the intervals between the slits are appropriately selected, so that the plural coned disk springs, which exhibit desired flat deformation time loads, can be obtained from the one plate member. Since the smaller outer diameter blank is punched from the inner region of the larger blank, the plate member which is a raw material can be efficiently used. The punching of the larger outer diameter blank and the smaller outer diameter blank can be simultaneously performed. As described above, since the material yield of the coned disk spring can be improved and the number of the production processes can be reduced, the production cost can be reduced.

According to another aspect of the present invention, a clutch unit includes: plural clutch mechanisms having axes corresponding to each other. Each of the clutch mechanisms includes: a cylindrical first member; a second member and a third member which are provided in the first member so as to be movable in an axial direction of the first member; and a coned disk spring which is annular and is provided between the second member and the third member. The coned disk springs has: thicknesses equal to each other; and outer diameters different from each other. Plural silts are formed at one of a peripheral portion and an inner peripheral portion of at least one of the coned disk springs.

In the clutch unit of the present invention, the plural silts are formed at the peripheral portion or the inner peripheral portion of at least one of the coned disk springs which have equal thicknesses. Therefore, the shapes of the slits, the number thereof, and the intervals between the slits are appropriately selected, so that the plural coned disk springs, which exhibit desired flat deformation time loads, can be obtained from the one plate member. As a result, since the material yield of the coned disk spring can be improved, the coned disk springs can be less expensive, so that the clutch unit can be less expensive.

The clutch unit of the present invention can use various structures. For example, a smaller outer diameter coned disk spring among the coned disk springs may have a size so as to be disposed inside a larger diameter coned disk spring among the coned disk springs. In this feature, a smaller outer diameter blank of the smaller outer diameter disk spring is punched from an inner region of the larger outer diameter blank of the larger outer diameter disk spring in the pressing of the production method for the coned disk springs, so that the number of the production processes can be reduced. Therefore, since the coned disk springs can be less expensive, the clutch unit can be less expensive.

EFFECTS OF THE INVENTION

In the production method for coned disk spring of the present invention, in the pressing, the plural slits are formed at the peripheral portion or the inner peripheral portion of at least one of the blanks, and the smaller outer diameter blank among the blanks is punched from the inner region among the larger outer diameter blank of the blanks. Therefore, the shapes of the slits, the number thereof, and the intervals between the slits are appropriately selected, so that the plural coned disk springs, which exhibit desired flat deformation time loads, can be obtained from the one plate member, and other effects can be obtained.

In the clutch unit of the present invention, since the plural coned disk springs, which exhibit desired flat deformation time loads, can be less expensive, the clutch unit can be less expensive, and other effects can be obtained.

EXPLANATION OF REFERENCE NUMERALS 1 denotes a primary coned disc spring (larger outer diameter coned disk spring), 2 denotes a secondary coned disc spring (smaller outer diameter coned disk spring), 30 denotes a clutch unit, 100 and 200 denote clutch mechanisms, 101 and 201 denote clutch drums (first members), 103 and 203 denote driven plates (second members), and 105 and 205 denote pistons (third members).

BEST MODE FOR CARRYING OUT THE INVENTION (1) Structure of Coned Disk Spring

Figures 1A, 1B:
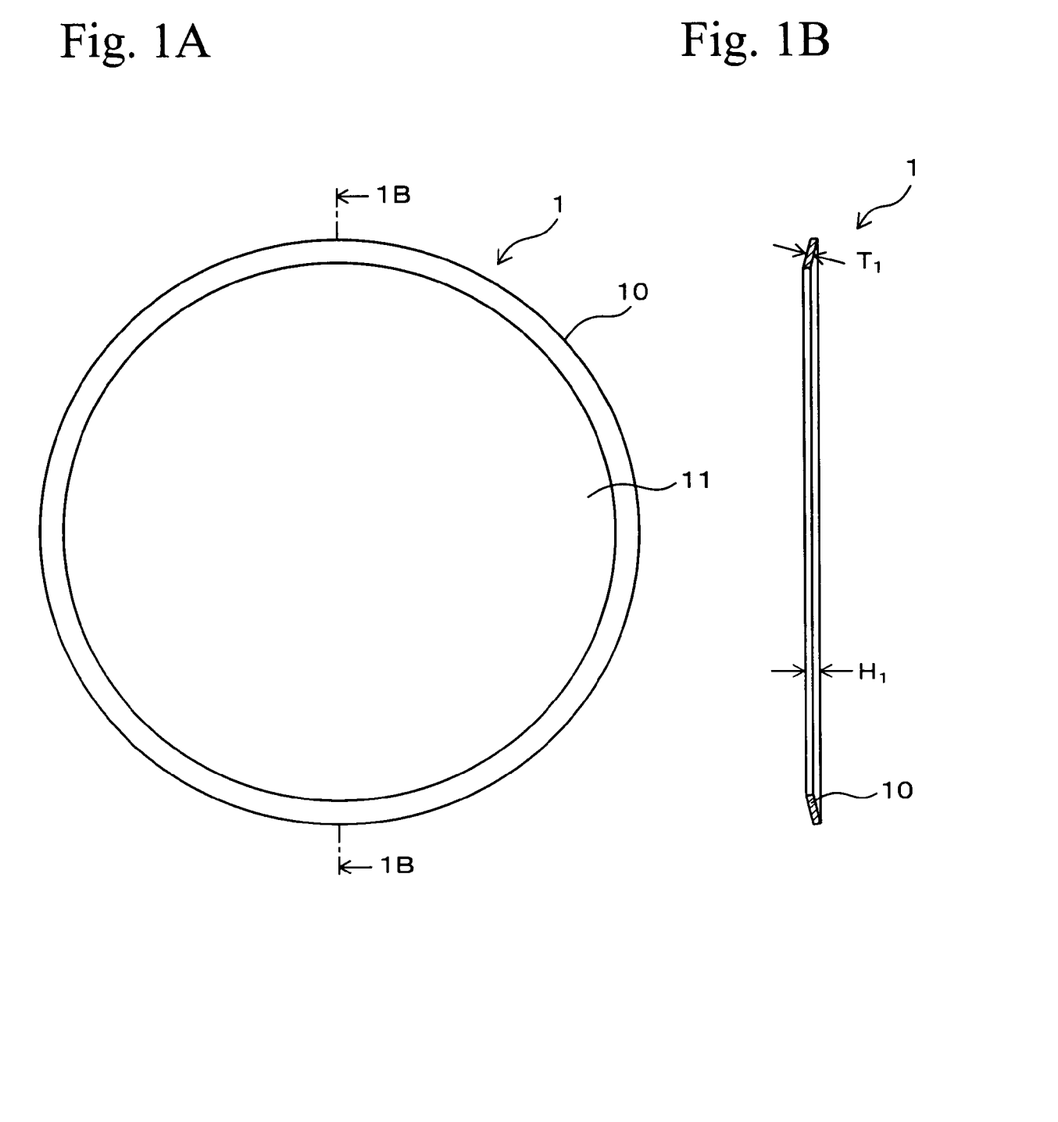
FIG. 1A is a plan view showing a structure of a primary coned disk spring of an embodiment according to the present invention.
FIG. 1B is a side cross sectional view of FIG. 1A along the line 1B-1B.
Figure 2A:
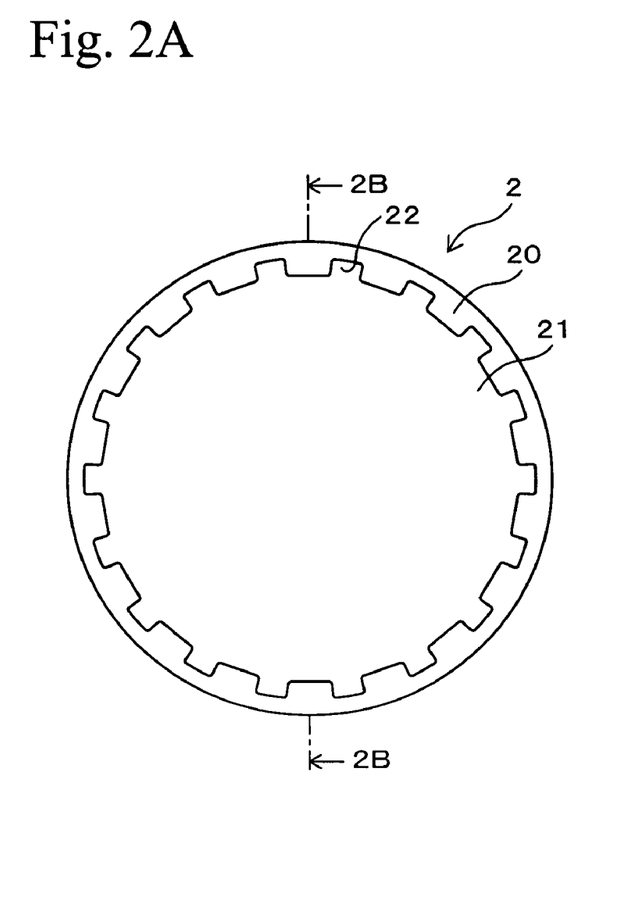
FIG. 2A is a plan view showing a structure of a secondary coned disk spring of an embodiment according to the present invention.
Figure 2B:
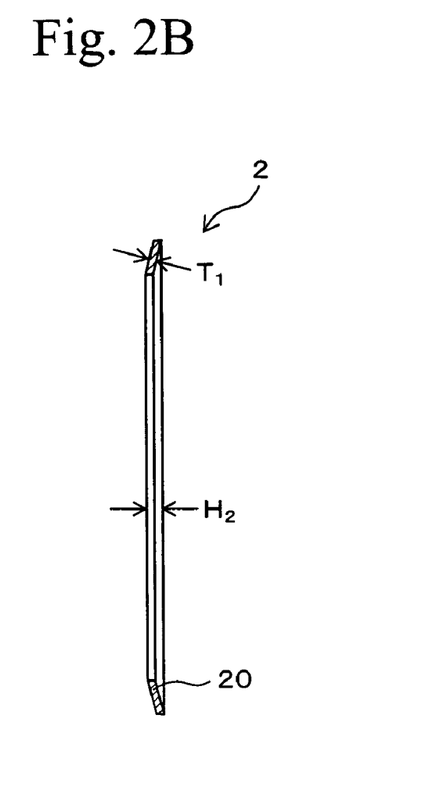
FIG. 2B is a side cross sectional view of FIG. 2A along the line 2B-2B.

One embodiment of the present invention will be explained hereinafter with reference to the drawings. FIGS. 1A to 2B are views showing a structure of a primary coned disk spring 1 (larger outer diameter coned disk spring) of the embodiment according to the present invention and a structure of a secondary coned disk spring 2 (smaller outer diameter coned disk spring) of the embodiment according to the present invention. FIG. 1A is a plan view, and FIG. 1B is a side cross sectional view of FIG. 1A along the line 1B-1B. FIG. 2A is a plan view, and FIG. 2B is a side cross sectional view of FIG. 2A along the line 2B-2B.

The primary coned disk spring 1 has a main body 10 and a circular hole 11. The main body 10 has an annular coned disk form, and the hole 11 is formed at a center portion of the main body 10. The secondary coned disk spring 2 has a main body 20 and a hole 21. The main body 20 has an annular coned disk form, and the hole 21 is formed at a center portion of the main body 20. Plural slits 22, which are nearly rectangular, are formed at an inner peripheral portion of the main body 20 in a circumferential direction so as to be equally spaced from each other. The primary coned disk spring 1 has an inner diameter larger than an outer diameter of the secondary coned disk spring 2. In particular, in this embodiment, the primary coned disk spring 1 has a size which allows it to be disposed inside the primary coned disk spring 1. The primary coned disk spring 1 and the secondary coned disk spring 2 have the same thickness $T_1$. The primary coned disk spring 1 has a height $H_1$. The secondary coned disk spring 2 has a height $H_2$.

In this embodiment, as denoted by the point A in FIG. 3A, the primary coned disk spring 1 has a stroke distance $ST_1$ and a flat deformation time load $P_1$. Since the secondary coned disk spring 2 is a coned disk spring with silts, which has slits 22 at an inner circumferential portion thereof, as denoted by the point B in FIG. 3A, the secondary coned disk spring 2 has a stroke distance $ST_2$ and a flat deformation time load $P_2$, which are the same as those of secondary coned disk spring having a thickness $T_2$ which is smaller than the thickness $T_1$.

The slits, which are used in the present invention, are not limited to the slits 22 shown in FIG. 2A, and various structures thereof can be used. For example, the shape and the number of the slits can be freely selected. Intervals between the slits 22 may not be equal to each other, and they can be freely selected. The slits may be formed at an outer circumferential portion of the secondary coned disk spring 2 instead of the inner circumferential portion of the secondary coned disk spring 2.

(2) Production Method of Coned Disk Spring

Figures 4A, 4B:
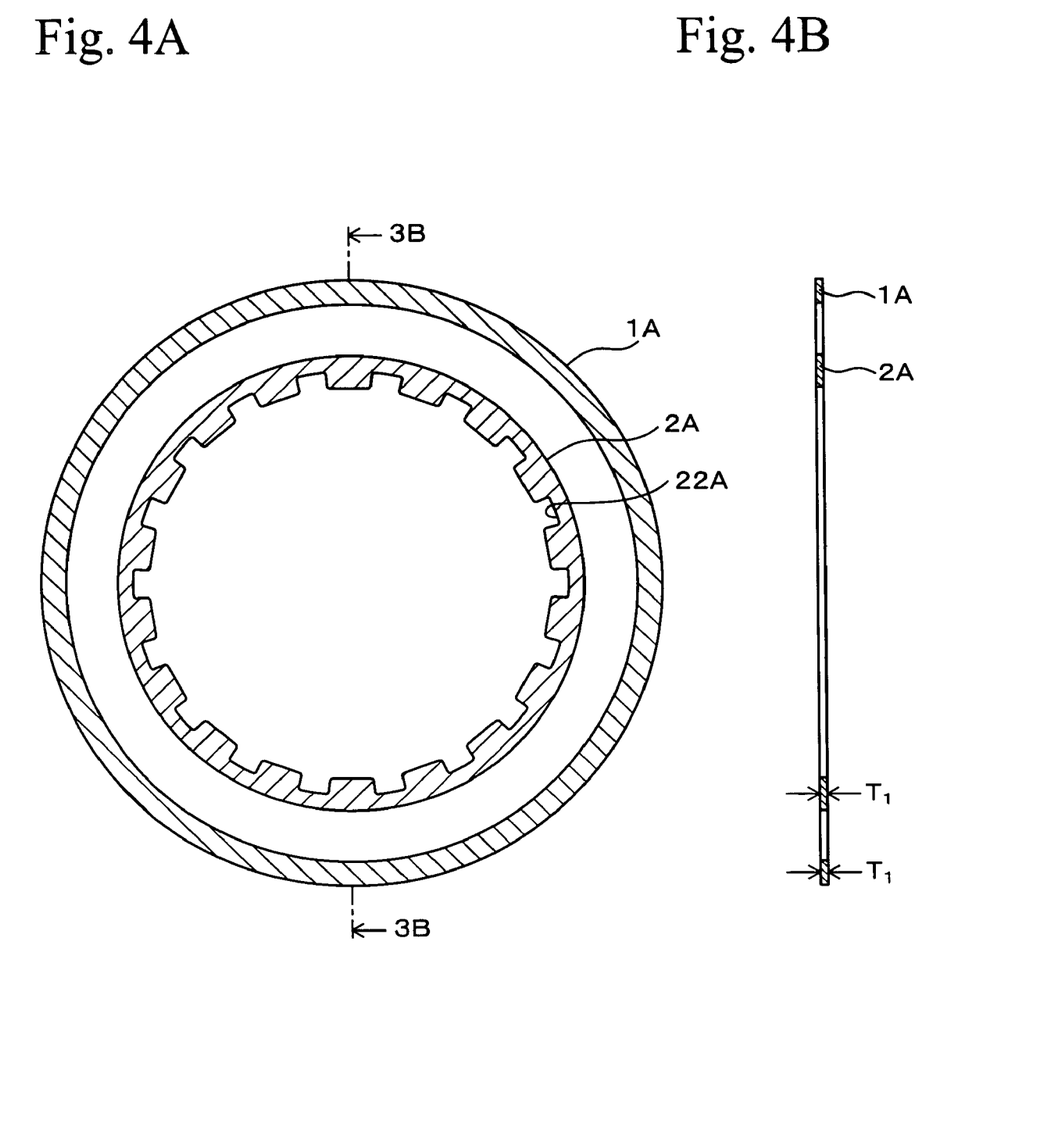
FIG. 4A is a cross sectional view showing structures of blanks of the primary coned disk spring and the secondary coned disk spring shown in FIGS. 1A to 2B.
FIG. 4B is a side cross sectional view of FIG. 4A along the line 3B-3B.

Next, a production method for a primary coned disk spring 1 and a secondary coned disk spring 2 will be explained with reference to FIGS. 4A and 4B. FIG. 4A is a cross sectional view showing structures of blanks 1A and 2A of the primary coned disk spring 1 and the secondary coned disk spring 2 shown in FIGS. 1A to 2B, and FIG. 4B is a side cross sectional view of FIG. 4A along the line 3B-3B. First, by pressing, an annular blank 1A is punched from a plate member of thickness $T_1$ and an annular blank 2A is punched from an inner region of the blank 1A. In this case, slits 22A are formed at an inner circumferential portion of the blank 2A in a circumferential direction so as to be equally spaced from each other.

Next, the blanks 1A and 2A are subjected to bending at room temperature so as to be in the shape of a dish without a bottom. The dish-shaped blanks 1A and 2A are subjected to heating (quenching and tempering), so that a primary coned disk spring 1 is obtained from the dish-shaped blank 1A, and a secondary coned disk spring 2 is obtained from the dish-shaped blank 2A. The bending and the heating may be performed simultaneously.

(3) Construction of Clutch Unit

Figure 5:
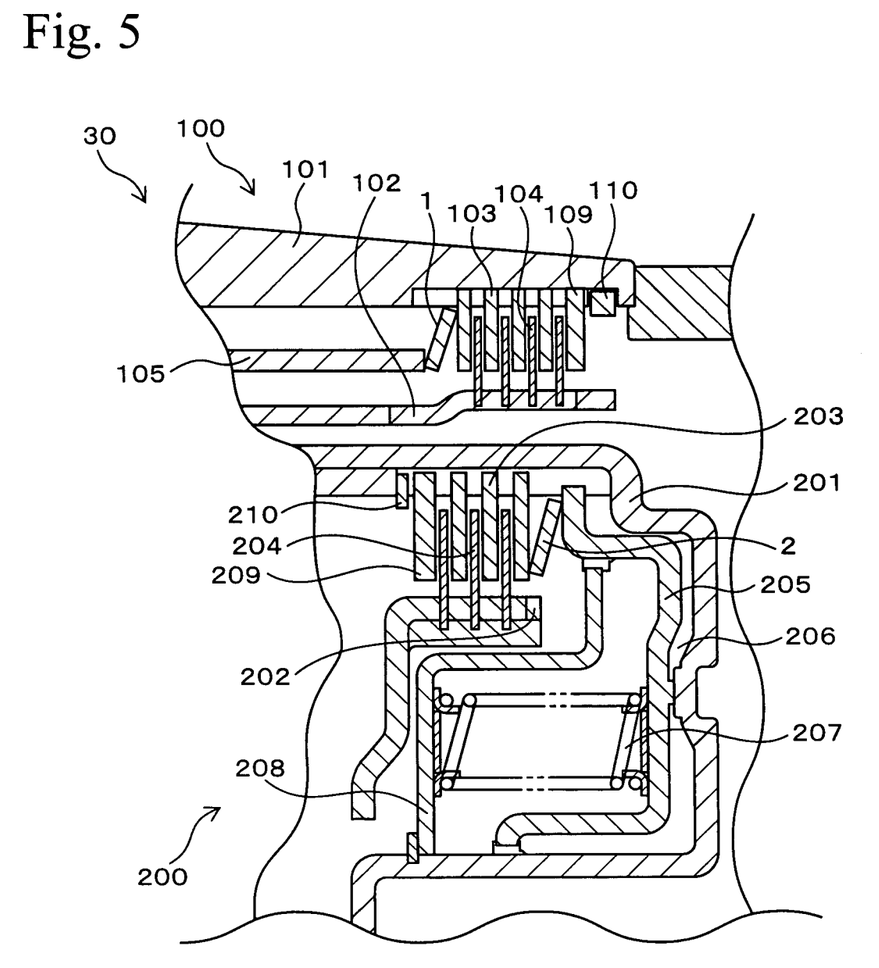
FIG. 5 is a side cross sectional view showing a structure of multiple-plate clutch unit using the primary coned disk spring and the secondary coned disk spring shown in FIGS. 1A to 2B.

The above coned disk springs 1 and 2 can be used for a clutch unit 30 shown in FIG. 5. FIG. 5 is a side cross sectional view showing a construction of the clutch unit 30. For example, the clutch unit 30 is used for CVT vehicles. The clutch unit 30 is equipped with a wet multiple-plate type reverse clutch mechanism 100 and a wet multiple-plate type forward clutch mechanism 200. The forward clutch mechanism 200 is provided in a nearly cylindrical cavity portion formed inside the reverse clutch mechanism 100, and it has the same rotational axis as the reverse clutch mechanism 100.

The reverse clutch mechanism 100 is equipped with a clutch drum 101 which is nearly in the shape of a cup. Plural spline grooves extending in the axial direction are formed at an inner circumferential surface of the clutch drum 101 in a circumferential direction so as to be equally spaced from each other. A cylindrical clutch hub 102 is provided inside the clutch drum 101 so as to have the same rotational axis as the clutch drum 101. Plural spline grooves extending in the axial direction are formed at an outer circumferential surface of the clutch hub 102 in a circumferential direction so as to be equally spaced from each other.

Driven plates 103 and driving plates 104 are provided between the clutch drum 101 and the clutch hub 102 so as to be movable in the axial direction. The driven plates 103 and the driving plates 104 alternate with each other so as to be spaced a predetermined distance from each other. The driven plates 103 are fitted into the spline grooves of the clutch drum 101 and the driving plates 104 are fitted into the spline grooves of the clutch hub 102. A piston 105 is disposed on a side (left side in FIG. 5) of bottom surface of the clutch drum 101 so as to be movable in the axial direction. An oil pressure chamber (not shown in FIG. 5), to which hydraulic oil is supplied, is formed between the clutch drum 101 and the piston 105. An end portion of return spring (not shown in FIG. 5) is secured at an opening side surface of the piston 105. The return spring extends or contracts by pressure applied to the piston 105, and it biases the piston 105 toward the side of the bottom surface of the clutch drum 101.

The above primary coned disk spring 1 is disposed between the driven plate 103 and the piston 105, the driven plate 103 being proximate to the bottom surface of the clutch drum 101. In this case, the primary coned disk spring 1 is disposed such that an inner circumferential portion of the main body 10 is supported by the piston 105, and an outer circumferential portion of the main body 10 is supported by the driven plate 103. Thus, the primary coned disk spring 1 is movable in the axial direction. A retaining plate 109 for supporting the driven plate 103 and the driving plate 104 is disposed proximate to the opening of the clutch drum 101. A snap ring 110 for preventing the retaining plate 109 from separating to the outside is disposed at the opening side surface proximate to the retaining plate 109.

The forward clutch mechanism 200 is equipped with a clutch drum 201 which is nearly in the shape of a cup. The clutch drum 201 is provided in a nearly cylindrical cavity portion formed inside the clutch hub 102 of the reverse clutch mechanism 100. Plural spline grooves extending in the axial direction are formed at an inner circumferential surface of the clutch drum 201 in a circumferential direction so as to be equally spaced from each other. A cylindrical clutch hub 202 is provided inside the clutch drum 201 so as to have the same rotational axis as the clutch drum 201. Plural spline grooves extending in the axial direction are formed at an outer circumferential surface of the clutch hub 202 in a circumferential direction so as to be equally spaced from each other.

Driven plates 203 and driving plates 204 are provided between the clutch drum 201 and the clutch hub 202 so as to be movable in the axial direction. The driven plates 203 and the driving plates 204 alternate with each other so as to be spaced a predetermined distance from each other. The driven plates 203 are fitted into the spline grooves of the clutch drum 201 and the driving plates 204 are fitted into the spline grooves of the clutch hub 202. A piston 205 is disposed on a side of bottom surface of the clutch drum 201 so as to be movable in the axial direction. An oil pressure chamber 206 to which hydraulic oil is supplied is formed between the clutch drum 201 and the piston 205. An end portion of return spring 207 is secured at an opening side surface of the piston 205. The other end portion of the return spring 207 is secured on a spring retainer 208 provided on the clutch drum 201. The return spring 207 extends or contracts by pressure applied to the piston 205. The return spring 207 extends or contracts by pressure applied to the piston 205. The return spring 207 biases the piston 205 toward the bottom surface of the clutch drum 201.

The above secondary coned disk spring 2 is disposed between the driven plate 203 and the piston 205, the driven plate 203 being proximate to the bottom surface of the clutch drum 201. In this case, the secondary coned disk spring 2 is disposed such that an inner circumferential portion of the main body 20 is supported by the driven plate 203 and an outer circumferential portion of the main body 20 is supported by the piston 205. Thus, the secondary coned disk spring 2 is movable in the axial direction. A retaining plate 209 for supporting the driven plate 203 and the driving plate 204 is disposed proximate to an opening of the clutch drum 201. A snap ring 210 for preventing the retaining plate 209 from separating to the outside is disposed at an opening side surface of the retaining plate 209.

(4) Action of Clutch Unit

Next, actions of the clutch mechanisms 100 and 200 using the coned disk springs 1 and 2 will be explained with reference to the drawings (in particular, FIG. 5). The reverse clutch mechanism 100 is used in reverse driving of CVT vehicle and the forward clutch mechanism 200 is used in forward driving of CVT vehicle. Since the clutch mechanisms 100 and 200 act in each driving in the same manner, explanation of the action of the forward clutch mechanism 200 will be given hereinafter and explanation of the action of the reverse clutch mechanism 100 will be omitted hereinafter.

When hydraulic oil is supplied to the oil pressure chamber 206, the piston 205 is driven by oil pressure, thereby resisting a biasing force of the return spring 207 and moving toward the opening of the clutch drum 201 in the axial direction. The piston 205 presses the driven plate 203 via the secondary coned disk spring 2, the driven plate 203 being proximate to the bottom surface of the clutch drum 201. Thus, the driven plates 203, the driving plates 204 and the retaining plate 209 move toward the opening of the clutch drum 201 in the axial direction, the driven plates 203 and the driving plates 204 alternating with each other. The retaining plate 209 is pressed onto the snap ring 210 by this movement, so that frictional surfaces of the driven plates 203 and the driving plates 204, which face each other, engage with each other. Therefore, the engaging action of the clutch mechanism 200 is performed, so that torque transmission can be performed between the clutch drum 201 and the clutch hub 202. In this case, the secondary coned disk spring 2 elastically deforms such that the shape of the secondary coned disk spring 2 changes from a shape which is similar to that of a dish to one which is nearly flat, thereby absorbing shocks occurring in the engaging action of the clutch mechanism 200. In this case, as denoted by the point B in FIG. 3A, the flat deformation time load of the secondary coned disk spring 2 is load $P_2$.

Next, the hydraulic oil is discharged from the oil pressure chamber 206, so that the piston 205 is pressed and returns toward the bottom surface of the clutch drum 201 by the biasing force of the return spring 207. Thus, the engagement of the frictional surfaces of the driven plates 203 and the driving plates 204 is released, the engaging action of the clutch mechanism 200 is released, and the shape of the secondary coned disk spring 2 returns to the initial shape thereof.

In the production method for coned disk spring of the embodiment, the plural silts 22A are formed at the outer circumferential portion or the inner circumferential portion of at least one of the plural blanks 1A and 2A. Therefore, the shapes of the slits 22A, the number thereof, and the intervals between the slits 22A are appropriately selected, so that the primary coned disk spring 1 and the secondary coned disk spring 2, which exhibit desired flat deformation time loads, can be obtained from the one plate member. Since the blank 2A of the secondary coned disk spring 2 is punched from the inner region of the blank 1A of the primary coned disk spring 1, the plate member, which is a raw material, can be efficiently used. The punching of the blank 1A and the blank 2A, which correspond to the coned disk springs 1 and 2, can be simultaneously performed. As described above, the material yield of the primary coned disk springs 1 and 2 can be improved and the number of the production processes can be reduced, so that the production cost can be reduced.

In the clutch unit 30 of the embodiment, the plural silts 22 are formed at the outer circumferential portion or the inner circumferential portion of at least one of the primary coned disk spring 1 and the secondary coned disk spring 2 which have thicknesses equal to each other. Therefore, the shapes of the slits 22, the number thereof, and the intervals between the slits 22 are appropriately selected, so that the coned disk springs 1 and 2, which exhibit desired flat deformation time loads, can be obtained from the one plate member. As a result, since the material yield of the coned disk springs 1 and 2 can be improved, the coned disk springs 1 and 2 can be less expensive, and the clutch unit 30 can thereby be less expensive.

In particular, since the smaller diameter blank 2A is punched from the inner region of the larger outer diameter blank 1A in the pressing of the production method for the primary coned disk spring 1 and the secondary coned disk spring 2, the number of the production processes can be reduced. Therefore, since the coned disk springs 1 and 2 can be less expensive, the clutch unit 30 can be less expensive.

(5) Modification Example

Although the present invention is explained by using the above embodiment as described above, the present invention is not limited to the above embodiment, and it can be modified in various ways. For example, instead of forming the slits 22 at the inner circumferential portion (or outer circumferential portion) of the secondary coned disk spring 2, slits may be formed at an inner circumferential portion or an outer circumferential portion of the primary coned disk spring 1 as shown in the case described in FIG. 3B. Plural teeth may be formed at the outer circumferential portions of the primary coned disk spring 1 and the secondary coned disk spring 2 so as to project toward an outer radial direction. The teeth of the primary coned disk spring 1 and the secondary coned disk spring 2 are fitted into spline grooves of the clutch drums 101 and 102, and they prevent relative rotation of the primary coned disk spring 1 and the secondary coned disk spring 2.

Although the clutch unit 30 is equipped with the clutch mechanisms 100 and 200 in the above embodiment, the present invention is not limited to this. For example, the clutch unit 30 is equipped with three or more clutch mechanisms which have axes corresponding to each other. In this case, in coned disk springs used for the clutch mechanisms, in the same manner as in the above embodiment, slits may be appropriately formed at inner circumferential portions or outer circumferential portions thereof, and the coned disk springs may be obtained from one plate member having the same thickness, so that they exhibit flat deformation time loads corresponding to each clutch mechanism. Although the present invention is used for the multiple-plate clutch unit of CVT vehicle in the above embodiment, the present invention is not limited to this. For example, the present invention can be used for multiple-plate clutch units of transport machines (for example, AT vehicles, construction machines, and motorcycles).

Although the primary coned disk spring 1 and the secondary coned disk spring 2 which are obtained from the one plate member are used for the clutch unit 30, the present invention is not limited to this. For example, the primary coned disk spring 1 and the secondary coned disk spring 2 can be respectively used for clutch units which are different from each other. Although the primary coned disk spring 1 and the secondary coned disk spring 2 use the flat deformation time loads, which generated in the nearly flat shape thereof, as loads of the coned disk springs 1 and 2 in the clutch mechanisms 100 and 200, the present invention is not limited to this. For example, the primary coned disk spring 1 and the secondary coned disk spring 2 can use loads which are generated at freely selected stroke distances ST before they are deformed to be nearly flat.

The invention claimed is:

1. A production method for coned disk springs, comprising:
    preparing a plate member;
    punching plural annular blanks from the plate member by pressing; and
    forming the blanks into coned disk springs,
    wherein in the pressing, plural slits are formed at one of a peripheral portion and an inner peripheral portion of at least one of the blanks, and a smaller outer diameter blank among the blanks is punched from an inner region of a larger outer diameter blank among the blanks, each of the coned disk springs having a characteristic flat deformation timeload, and wherein flat deformation timeload of the coned disk spring with the plural slits is adjusted by formation of the slits.

2. A clutch unit comprising:
    plural clutch mechanisms having axes corresponding to each other, each of the clutch mechanisms comprising:
    a cylindrical first member;
    a second member and a third member which are provided in the first member so as to be movable in an axial direction of the first member; and
    a coned disk spring which is annular and is provided between the second member and the third member, wherein the coned disk springs having:
    thicknesses equal to each other; and
    outer diameters different from each other, wherein
    plural silts are formed at one of a peripheral portion and an inner peripheral portion of at least one of the coned disk springs, wherein a load of the coned disk spring is set by formation of the slits, and wherein the load is generated when the coned disk spring shows a predetermined stroke distance in engaging action of the clutch mechanism.

3. A clutch unit according to claim 2, wherein a smaller outer diameter coned disk spring among the coned disk springs has a size so as to be disposed inside a larger diameter coned disk spring among the coned disk springs.

* * * * *